United States Patent [19]

Vallier

[11] Patent Number: 5,226,997
[45] Date of Patent: Jul. 13, 1993

[54] MOLD LINERS FOR RESIN TRANSFER MOLDING

[75] Inventor: Paul A. Vallier, Kensington, Conn.

[73] Assignee: United Technologies Corporation, Hartford, Conn.

[21] Appl. No.: 904,190

[22] Filed: Jun. 25, 1992

Related U.S. Application Data

[62] Division of Ser. No. 399,679, Aug. 28, 1989, Pat. No. 5,134,002.

[51] Int. Cl.$^5$ ............................................. B29C 43/02
[52] U.S. Cl. .................... 156/228; 156/245; 156/285; 264/257; 264/269; 264/328.1
[58] Field of Search ............... 156/228, 245, 288, 323, 156/285, 382; 264/257, 269, 328.1; 249/112, 83, 97, 180; 425/89, 389, 398, 346

[56] References Cited

U.S. PATENT DOCUMENTS 2,456,093 12/1948 Swedlow ............................ 156/285
2,613,397 10/1952 Borkland ............................ 156/228
4,030,953 6/1977 Rutschow et al. ................. 156/245

FOREIGN PATENT DOCUMENTS 532845 10/1983 Australia .
2933960 3/1981 Fed. Rep. of Germany .
2555496 5/1985 France .

*Primary Examiner*—Caleb Weston
*Attorney, Agent, or Firm*—McAulay, Fisher, Nissen, Goldberg & Kiel

[57] ABSTRACT

A preform assembly for use with a resin transfer molding apparatus. The preform comprises an upper liner formed to the shape of a first mold half, the upper liner having a peripheral portion, a dry fabric preform, and a lower liner formed to the shape of a second mold half, the lower liner having a peripheral portion. The preform is sandwiched between the upper liner and lower liner to form the preform assembly having peripheral portions which extend beyond the preform to form a sealing area. The upper liner is sealed to the lower liner at the sealing area. The preform assembly facilitates the loading of the preform into a molding apparatus as well as facilitating the handling and storage of the preform prior to and subsequent to molding. Methods of making the preform assembly, as well as a composite article, are also disclosed

5 Claims, 2 Drawing Sheets

MOLD LINERS FOR RESIN TRANSFER MOLDING

This is a division of application Ser. No. 399,679, filed Aug. 28, 1989, U.S. Pat. No. 5,134,002.

TECHNICAL FIELD

The present invention relates to resin transfer molding and, more specifically, to a preform assembly which facilitates handling and storage of a preform before and after molding, as well as clean-up of the resin transfer mold apparatus subsequent to molding.

BACKGROUND ART

Resin transfer molding is a closed mold, low pressure process applicable to the fabrication of complex, high performance composite articles of both large and small size. Several different resin transfer molding processes are well known to those skilled in the art. The process differs from various other molding processes in that a reinforcing material or preform such as glass fibers or other fiber reinforcement, is placed separately into a mold tool cavity. Resin is then injected under pressure into the mold cavity to combine with the preform to form a fiber reinforced resin composite product.

Typically, a pre-shaped fiber reinforced preform is positioned within a molding tool cavity that has been carefully cleaned and coated with a standard mold release material to prevent the finished, molded part from catastrophically bonding to the mold (i.e., in some cases, adhesion of the finished, molded part to the mold is so complete that separation is impossible to accomplish and both the part and the mold has to be scrapped). After the molding tool is closed, the mold is subsequently evacuated by pulling or applying a mechanical vacuum to the mold cavity. This vacuum is typically in the range of 29 inches of mercury or greater. A feed line connects the closed molding tool cavity to a supply of liquid resin. The resin is pumped or "transferred" into the cavity where it impregnates and envelopes the fiber reinforced preform and is subsequently cured. The cured or semi-cured product is then removed from the molding tool cavity.

The primary advantage of resin transfer molding resides in its capacity for high rate production. Although this process is widely known, the use of this molding process has not become widespread because of problems associated with the process. For example, use of the process has been hampered by the difficulties associated with stabilizing and de-bulking the dry composite preform and loading the same into or around a mold cavity or part.

In addition, conventional resin transfer molds utilize "take apart" mold halves that are assembled around the dry fabric preform. It is difficult to seal these molds adequately enough to achieve a high level of vacuum integrity because of the numerous metal-to-metal joints. Furthermore, intensive clean-up of the mold apparatus is required after molding and prior to reuse as a result of the infiltration and intrusive properties of the low viscosity resins typically used in resin transfer molding. Not only does the resin completely coat all the visible mold surfaces, it further tends to penetrate, infiltrate and cement together adjacent mold surfaces that are inherently difficult to protect with standard mold release coatings. These surfaces would include crevices between mold sections, crevices between threaded upper/lower (or female/male) members, small clearances between close fitting alignment pins, and alignment bushings used to precisely assemble mold details to the mold body or provide alignment to the mold halves themselves during mold opening/closing sequences. The application of up to 500 degrees Fahrenheit (°F.) to these molds during normal cycling tends to further aggravate the problem of achieving a vacuum tight mechanical fit as a reliable means of sealing the mold to prevent undesirable resin migration outside the molded part cavity area. Finally, handling and storage of the preforms is limited by the dry, loosely woven nature of the composite fabric. As a result, use of the process has typically been limited to simple low-strength components as compared to high strength aerospace components.

Thus, there is a continuing need in this field of art for means to obviate the above problems.

DISCLOSURE OF THE INVENTION

Accordingly, it is an object of the present invention to facilitate storage and handling of preforms while eliminating the possibility of preform contamination both prior to and subsequent to the molding process.

Another object is to provide a stabilization technique which facilitates the loading of preforms into a resin transfer mold apparatus.

A further object is to diminish or nearly eliminate the time consuming clean-up of the mold apparatus subsequent to the molding process. A related objective would be the elimination of the mold release coating operation on a mold prior to starting the molding cycle to produce a component part.

The present invention utilizes a preform assembly for use in a resin transfer molding apparatus. More specifically, the present invention comprises an upper liner formed to the shape of a first mold half wherein the upper liner has a peripheral portion, a dry fabric preform, and a lower liner formed to the shape of a second mold half wherein the lower liner has a peripheral portion. The preform is sandwiched between the upper liner and lower liner to form the preform assembly having peripheral portions which extend beyond the preform to form a sealing area. The upper liner is sealed to the lower liner at the sealing area. The preform assembly facilitates the handling and storage of the preform prior to and subsequent to molding.

A further aspect of the present invention includes a method for preparing a preform assembly which includes forming an upper liner to the shape of a first mold half wherein the upper liner has a peripheral portion, cutting a plurality of two-dimensional fabric patterns to a desired shape, forming a lower liner to the shape of a second mold half wherein the lower liner has a peripheral portion, laying up the fabric patterns onto the lower liner wherein the patterns are stacked to a desired thickness to form a preform, placing the upper liner over the preform and the lower liner to form a preform assembly, and sealing the peripheral portions of the upper and lower liners together.

A still further aspect of the present invention includes a method for making a composite article which includes positioning a preform assembly as described by the present invention over a lower mold half of a resin transfer molding tool, closing the upper mold half of the molding tool on the preform assembly pressing the sealing area together to form a seal and evacuating the air from the chamber formed by the two sealed liners, introducing resin into the chamber of the molding tool to form a composite article, and removing the article from the molding tool subsequent to curing and cooling of the article.

The foregoing and other features and advantages of the present invention will become more apparent from the following description and accompanying drawings.

BEST MODE FOR CARRYING OUT THE INVENTION

Figure 1:
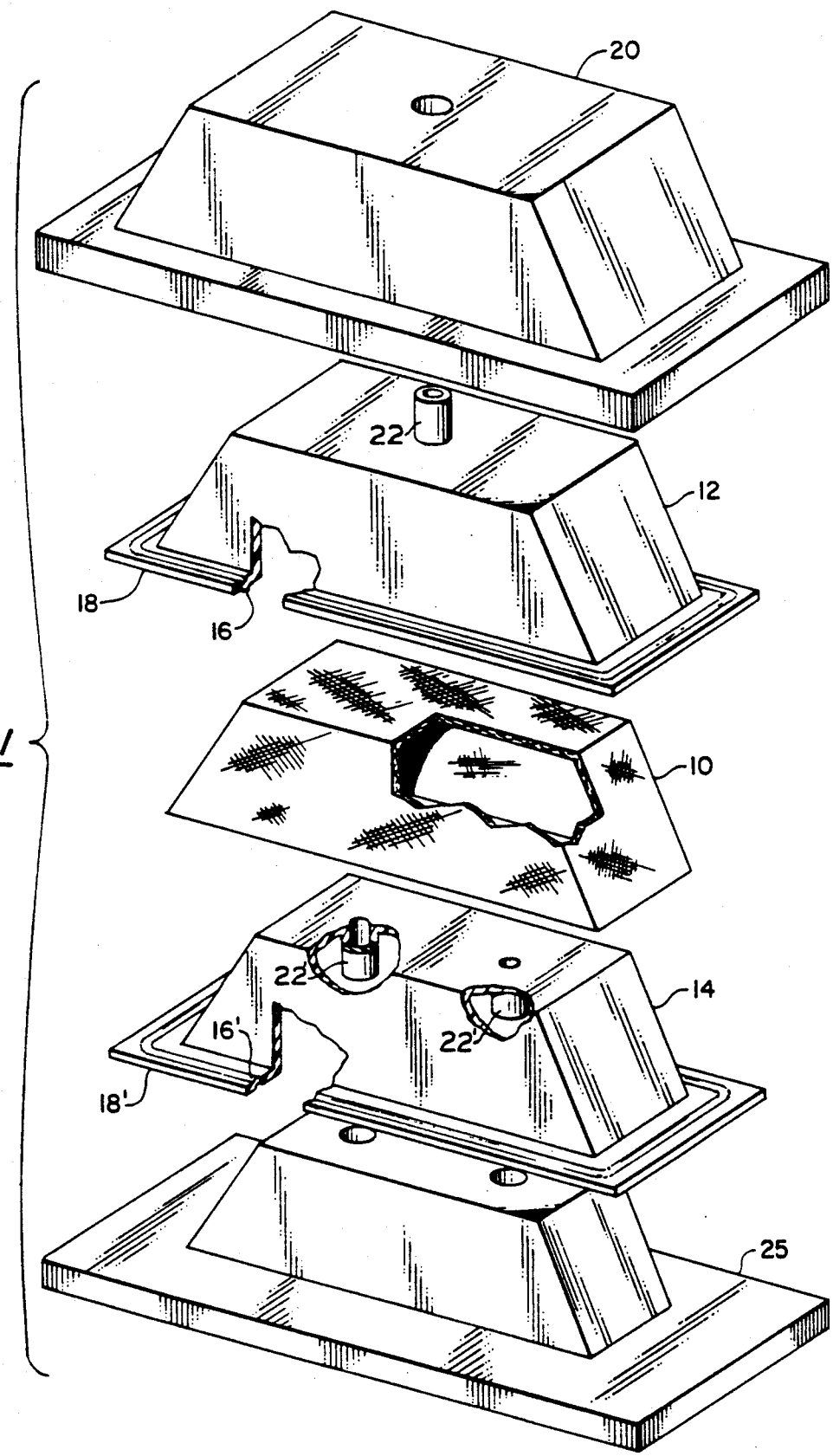
FIG. 1 depicts a exploded perspective view of a disassembled present invention and a prior art molding apparatus partly broken away and partly in section.
Figure 2:
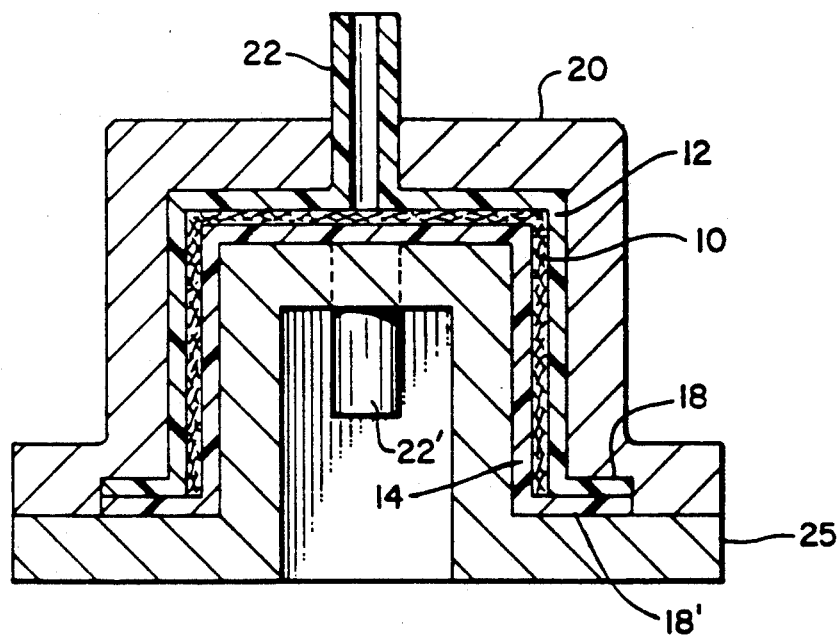
FIG. 2 depicts a cross-sectional view of an assembled present invention and a prior art molding apparatus.

A clearer understanding of the reference to FIGS. 1 and 2.

A dry fabric preform 10 is illustrated in FIG. 1. The preform 10 comprises a plurality of fabric patterns cut to the desired two dimensional shape and stacked to yield the desired two preform thickness. An upper mold half liner 12 and a lower mold half liner 14 are further depicted. The upper liner 12 and lower liner 14 are formed by conventional methods to the shape of a first mold half and a second mold half, respectively. The liners 12 and 14 contain peripheral portions 18 and 18', respectively, for establishing an airtight preform cavity by a sealing means 16 and 16'. Typically, inlet and exit ports 22 and 22' serve as resin injection and vacuum ports and protrude through the first and second mold halves, respectively. Alternatively, these ports may be placed on the liner sides or near the sealing means to facilitate the manufacturing process or accommodate the mold shape.

The preform 10 is directly laid-up over the lower liner 14. The upper liner 12 is then placed over the preform 10 and lower liner 14 to form a preform assembly 15. Alternately, the preform 10 is laid up separately and placed between the upper liner 12 and lower liner 14. The peripheral portions 18 and 18' are held together by the sealing means 16 and 16'. This stabilizes the preform 10 which can easily be loaded into a resin transfer mold apparatus, consisting of a first mold half 20 and a second mold half 25. The preform assembly 15 is placed over the second mold half 25. The first mold half 20 is subsequently placed over the preform assembly 15 to close the mold and press the peripheral portions 18 and 18' of the upper liner 12 and lower liner 14 together at the sealing means 16 and 16'. This serves to create an air-tight seal and cavity once evacuated.

More specifically, the dry fabric preform comprises a plurality of fabric patterns cut to the desired two dimensional shape. These patterns are then stacked upon each other to yield a desired preform thickness. The fabric preform used in the present invention are made from materials conventional to those in the art, such as glass fibers, carbon or graphite fibers and aramid fibers including KEVLAR (TM) brand fiber (Dupont de Nemours, E. I., Co., Wilmington, Del.) and the like. Such fibrous reinforced material can be used in the preforms in any number of various configurations including, for example, random chopped fiber, continuous random fiber, and oriented continuous fiber, for example, nonwoven, woven, knitted, braided, etc.

The upper and lower liners are preferably made from a thermoplastic material, such material being pliable (i.e. soft) in the mold with the application of sufficient heat but capable of maintaining an air-tight article chamber once evacuated. Especially preferred thermoplastics include TEFLON (TM) brand resin (DuPont de Nemours, E. I., Co., Wilmington, Del.), ABS (acrylonitrile-butadiene-styrene) resin available from various standard commercial suppliers and FEP (fluorinated ethylenepropylene) resin available from for example, American Durafilm, Inc. (Newton Lower Falls, Mass.) because of their ability to be readily thermoformed to sheath mold contours and at the same time retain the solid state characteristics of impermeability and non-dissolution at elevated temperatures i.e., 350° F.-500° F.

The liners are of relatively uniform thickness. Preferably, the liner has a thickness that will provide suitable rigidity to stabilize the fabric preform and withstand the low pressures exerted during the molding process but is still flexible enough to conform to the composite part without wrinkles or gathers. Depending on the complexity of the preform shape, a typical liner thickness is between about 0.003 inches and about 0.1 inches The upper liner is formed to the shape of a first (upper) mold half while the lower liner is formed to the shape of a second (lower) mold half, such liners formed by conventional methods. For example, one possible method is vacuum forming. Each liner is typically heated as a suspended sheet until it softens. The liner is then draped over or brought in contact with a forming mold (a prototype of the mold half) which dimensionally simulates a mold half, and a vacuum is pulled between the liner and the mold. The liner is drawn around and conforms to the mold, and is subsequently cooled. The edges of the formed liner are trimmed in such a manner that a sufficient peripheral portion or flange remains, such portion or flange extending beyond the composite zone to form a sealing area.

The preform assembly of the present invention comprises at least two ports. The ports serve dual functions as resin injection and vacuum ports. For example, one port serves as the vacuum port, as well as the discharge/venting port during the subsequent curing process. Another port is typically connected to the supply of liquid resin. Additional ports may be adapted to a particular mold to aid in the manufacturing process.

Typically, the ports are formed as part of the liners or are connected to the upper and lower liners by means conventional to the art (e.g., vacuum valve #402 available from Airtech International, Inc., Carson, Calif.) and protrude through the respective mold halves. In this manner, the injected resin remains within the confines of the upper and lower liners. As a result, a minimal, if not negligible, amount of resin migration occurs, thus eliminating time consuming clean-up of the mold tool.

The preform assembly for use in a resin transfer mold apparatus is prepared by cutting a plurality of two-dimensional fabric patterns to the desired shape. The fabric patterns are stacked to the desired thickness to form the preform. Preferably, the lay-up is made directly over the pre-formed lower liner. The preform may contain a weak adhesive or be hot tacked to help retain the desired shape (i.e. to match that of the lower liner). The pre-formed upper liner is then placed over the preform and lower liner to form the preform assembly. Stated differently, the preform is sandwiched between the upper liner and lower liner to form the preform assembly. The peripheral portions of both liners extend beyond the preform and are sealed together at the sealing area of the upper and lower liners. Such sealing is typically accomplished by means known to those skilled in the art. For example, O-rings, hot ironing, and crimping are suitable techniques that serve to keep the preform assembly together and will provide an air-tight seal once the chamber is evacuated during the subsequent molding process.

The liners not only stabilize the fabric preform but also serve as a protective covering to the preform. Such assembly may be stored until use in a mold without contamination to the preform prior to use.

The preform assembly is easily loaded into the resin transfer mold apparatus. When the mold is fully assembled, the liners are pressed or pinched together by the mold halves to form a seal, except for the vacuum and resin ports, which guard against vacuum and resin leakage. A vacuum is pulled through one of the ports to evacuate any air in the mold before the resin is injected. The resin is transferred under pressure into the article chamber impregnating the dry fabric preform. The resin is forced into the mold under conventional pressures which typically range from atmospheric i.e., 14.6 psi to about 300 psi. Once the mold is full, the resin impregnated preform is exposed to conventional pressures and temperatures appropriate for the particular resin and fiber used and sufficient to cure the desired article. Typically, these pressures and temperatures are about 5 psi to about 300 psi and about ambient to about 500° F. Once fully cured and cooled, the mold can be disassembled. The article is demolded or removed with the liners remaining attached to it.

The resins used in the present invention are those conventional to the art such as polyimides, bismaleimide, epoxies, polyesters, vinyl esters and phenolics.

The use of the preform assembly not only provides a means to stabilize the dry preform to facilitate handling and storage prior to molding, but also serves to keep the preform dust and contamination-free. The assembly also protects the surface of the article from damage during any machining operations, as well as minimizing delamination from cutter forces. The liners of the preform assembly preferably travel with the molded composite article during shipping and are stripped off just prior to ultimate use. This enables the article's surface to remain clean and dust-free for subsequent painting, secondary bonding or the like. In addition, the need for mold release operations is obviated as the preform assembly prevents the finished molded article for catastrophically bonding to the molding apparatus. As a result, a more efficient and desirable process for producing resin transfer mold high strength components is created.

Although this invention has been shown and described with respect to a preferred embodiment, it will be understood by those skilled in the art that various changes in form and detail thereof may be made without departing from the spirit and scope of the claimed invention.

What is claimed is:

1. A method for making a composite article which comprises the steps of:
    (a) positioning a preform assembly over a lower mold half of a resin transfer molding tool, said preform assembly comprising an upper liner formed to the shape of an upper mold half of the resin transfer molding tool wherein said upper liner has a integral peripheral portion, a dry fabric preform, and a lower liner formed to the shape of the lower mold half wherein said lower liner has a integral peripheral portion, said preform being sandwiched between upper liner and lower liner to form said preform assembly, said peripheral portions extending beyond said preform to form a sealing area, said upper liner peripheral portions mated to said lower liner peripheral portions at said sealing area;
    (b) closing the upper mold half of said molding tool on said preform assembly pressing said mated peripheral portions together to form a seal and evacuating the air form the chamber formed by the two sealed liners;
    (c) introducing resin into said chamber of said molding tool to form a composite article; and
    (d) removing said article from said molding tool subsequent to curing and cooling of said article.

2. The method of claim 1 wherein said resin types are selected from the group of polyimides, bismaleimide, epoxies, polyesters, vinyl esters and phenolics.

3. The method of claim 1 wherein said resin transfer molding tool is substantially free of a mold release agent.

4. The method of claim 1 wherein said upper liner comprises a thermoplastic material which is readily thermoformed to the shape of the mold and which becomes pliable at elevated molding temperatures while retaining sold state characteristics of impermeability and non-dissolution.

5. The method of claim 1 wherein said lower liner comprises a thermoplastic material which is readily thermoformed to the shape of the mold and which becomes pliable at elevated molding temperatures while retaining sold state characteristics of impermeability and non-dissolution.

* * * * *